Patented Oct. 7, 1941

2,258,484

UNITED STATES PATENT OFFICE 2,258,484

STAND FOR COFFEE MAKERS

Harvey Cory, Chicago, Ill.

Application September 26, 1940, Serial No. 358,516

1 Claim. (Cl. 219—43)

My invention which relates generally to coffee makers, is concerned particularly with a stand therefor having a supporting base which is equipped with a fixed holder by which the coffee maker may be secured against displacement amidst unstable conditions such as obtain upon moving vehicles, trains, ships, etc.

A primary object of my invention is accordingly the provision of holding means whereby a coffee maker, when rested upon a base, may freely turn and, in one rotative position, be freely lifted and, in one position of elevation, be freely movable laterally for complete removal from the base, and except when so manipulated, will be secured against displacement or overturning. In the accomplishment of these ends the present holder works without any movement of its own, all manipulations being confined to the coffee maker itself.

A suggestive embodiment of my invention is set forth in the accompanying drawing where:

Figure 1 is a perspective view showing a pair of like coffee makers one of which is secured in place upon a stand by holding means to be hereinafter described, the other being in process of removal therefrom;

Fig. 2 is a view in vertical section taken on line 2—2 of Fig. 3;

Fig. 3 is a horizontal section taken on line 3—3 of Fig. 2, the coffee maker being shown in its secured position upon the stand; and Fig. 4, which is a horizontal section taken on line 4—4 of Fig. 1 shows the coffee maker as it appears during its removal from the stand.

Referring particularly to Fig. 1, I have illustrated a stand S having a base $x$ in the form of a stove from which rises a vertical back wall $w$. The coffee makers designed for reception upon such a stand comprise in each case a lower bowl $l$ (in the general form of a decanter) with which is combined an upper bowl $u$ (in the general form of a funnel), the two bowls being interfitted for handling as a unit. The lower bowl is formed with a relatively flat bottom 5 adapted to rest upon the stand which may be in the form of a stove, tray or the like, and at its top the lower bowl is constricted to provide a neck 6 around which is fitted a collar 7 from which is laterally extended a handle $h$. Also mounted to swing at one side of the neck is a lid 8 which in one position overlies the top of the lower bowl (when separated from the upper bowl) to provide a cover therefor, the lid in its other extreme position inclining outwardly to rest against the handle, as shown. Each bowl is desirably of generally globular shape with its maximum diameter at a substantially medial point.

The stand base, as shown, is provided with a pair of seats 10 of which only one is exposed to view. Each seat may be formed by a conical wall at whose base is a brick 11 having passages traversed by electrical heating elements 12. The bottom of the lower bowl of a coffee maker is adapted to rest upon the brick where it is centered in position by the surrounding seat within which it is loosely placed. Appropriate switches 13 control the flow of current to the heating elements so that a high or low heat may be delivered therefrom, as desired.

It is manifest that a stand base of the kind described will adequately meet the usual requirements where stable conditions exist. For use on rolling stock, ships, etc., where considerable motion is encountered, the coffee makers should be additionally secured, otherwise they are liable to slide off and away from the stand, and also to be overturned. In order to meet such conditions I have devised a stationary holder which cooperates with each coffee maker having the characteristics already described.

As shown, the holder comprises a ring 15 which is fixedly carried by the stand, conveniently by its back wall $w$ as by a rearward extension 16 which may be secured to its back wall $w$ (see Fig. 3). The elevation of this ring is about opposite the point of maximum diameter of the upper bowl. At one point in the ring, preferably on its front, is an opening so that the divided ring is, in consequence, in the form of two bowed arms $a$ and $b$ each adapted to encircle and engage with the associated upper bowl of the coffee maker when the latter is positioned upon the base as shown in Fig. 2. A lower divided ring 17, the same as the one just described, may also be optionally employed, its elevation being about opposite the point of maximum diameter of the lower bowl with which its two bowed arms $c$ and $d$ are adapted to engage (see Figs. 1 and 2).

In use, the coffee maker is advanced laterally toward the back wall of the stove with its neck at an elevation which is opposite the primary holder ring 15 whose opening is just wide enough to conveniently permit the neck to pass therethrough. The spacing between the two rings (if a lower ring be used) is such that when the neck is opposite the upper ring the bottom of the lower bowl is above the lower holder (see Fig. 1). When at this elevation, the coffee maker is free to be moved laterally into a position which is coaxial with respect to the seat upon which it may Oct. 7, 1941.     E. VOLLENWEIDER     2,258,503
MAGNETO FOR MODEL ENGINES
Filed Aug. 7, 1939
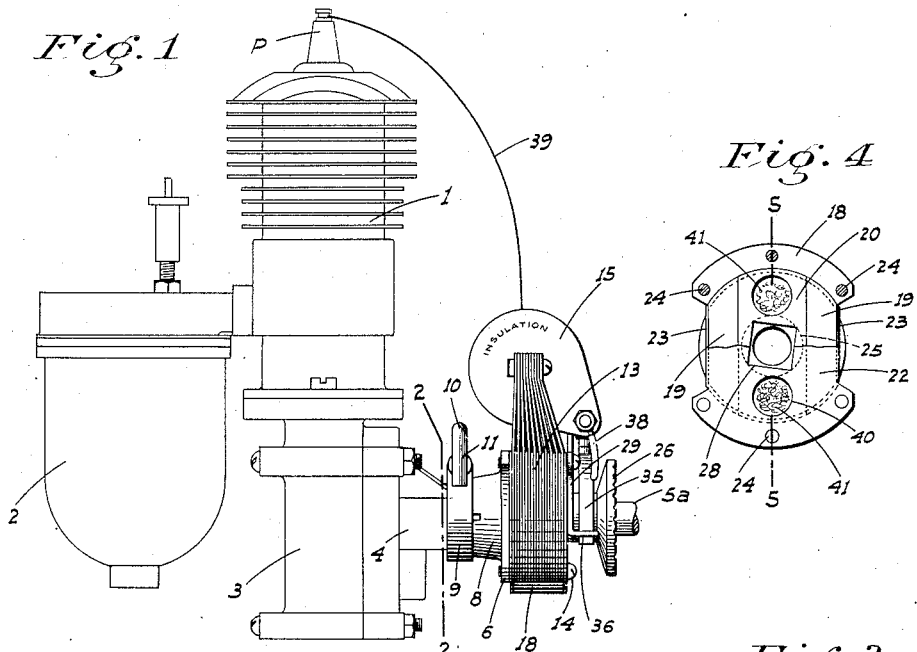
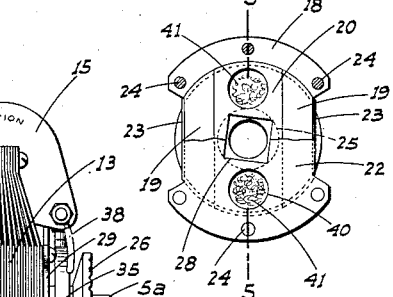
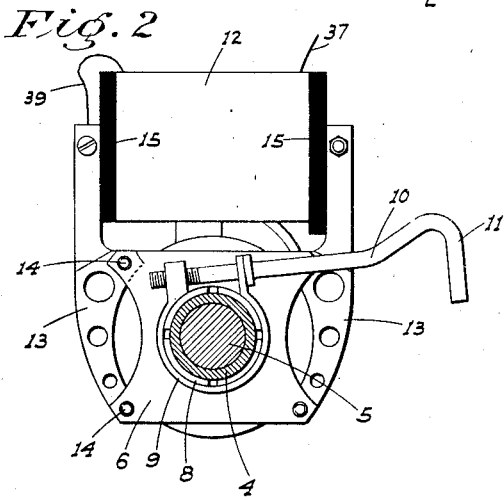
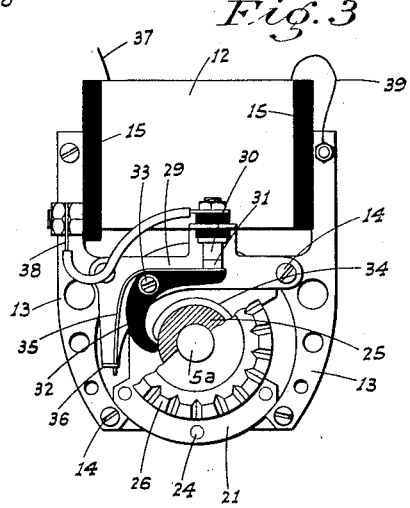
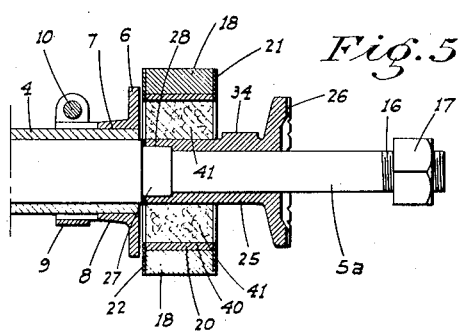
INVENTOR.
Emil Vollenweider
BY
ATTORNEY